(12) United States Patent
Pope, Jr.

(10) Patent No.: US 12,180,727 B2
(45) Date of Patent: Dec. 31, 2024

(54) CRACK-FILLING JOINT PUMP APPLICABLE TO POLISHED CONCRETE FLOORS

(71) Applicant: Refuse Materials, Inc., Ocilla, GA (US)

(72) Inventor: Donald A. Pope, Jr., Ocilla, GA (US)

(*) Notice: Subject to any disclaimer, the term of this patent is extended or adjusted under 35 U.S.C. 154(b) by 241 days.

(21) Appl. No.: 17/687,898

(22) Filed: Mar. 7, 2022

(65) Prior Publication Data

US 2022/0403672 A1 Dec. 22, 2022

Related U.S. Application Data

(60) Provisional application No. 63/213,289, filed on Jun. 22, 2021.

(51) Int. Cl.
| | |
|---|---|
| *E04G 23/02* | (2006.01) |
| *B05C 5/02* | (2006.01) |
| *E04F 21/24* | (2006.01) |

(52) U.S. Cl.
CPC ............ *E04G 23/0203* (2013.01); *B05C 5/02* (2013.01); *E04F 21/24* (2013.01)

(58) Field of Classification Search
CPC ..... E04G 23/0203; B05C 5/02; B05C 17/002; B05C 11/1036; E04F 21/24; B62B 1/26; B05B 9/007; B67D 7/84; B67D 7/845
See application file for complete search history.

(56) References Cited

U.S. PATENT DOCUMENTS

| | | | | |
|---|---|---|---|---|
| 4,096,973 A | * | 6/1978 | Checko | B05C 17/00523 |
| | | | | 392/471 |
| 4,621,770 A | * | 11/1986 | Sayen | A01G 25/145 |
| | | | | 239/444 |
| 4,865,255 A | * | 9/1989 | Luvisotto | B05B 9/0416 |
| | | | | 239/722 |
| 6,053,365 A | * | 4/2000 | O'Mara | B05C 17/002 |
| | | | | 222/608 |
| 6,279,838 B1 | * | 8/2001 | Sivells | A01G 25/09 |
| | | | | 239/146 |
| 6,538,258 B1 | * | 3/2003 | Rau | E04F 21/24 |
| | | | | 250/504 R |
| 9,242,267 B2 | * | 1/2016 | O'Leary | B29B 7/7409 |
| 2006/0070661 A1 | * | 4/2006 | Wheeler | B05B 9/007 |
| | | | | 137/355.12 |
| 2010/0024191 A1 | * | 2/2010 | Ledbetter | H02B 11/127 |
| | | | | 29/428 |

(Continued)

*Primary Examiner* — Donnell A Long
(74) *Attorney, Agent, or Firm* — Fishman Stewart PLLC

(57) ABSTRACT

Lightweight, battery-operated, walk-behind joint- and crack-filling equipment has no belts or chains to wear out, and no inverters or other electrical power-conversion apparatus. A single brushless battery-operated DC motor, directly coupled to two pumps, simultaneously delivers the resin and hardener to a wand, such that a single user can push the cart and apply the mixture. The portable cart includes a frame with a handle and single set of right and left wheels accommodates two containers holding the hardening components. The containers may be pails or buckets or bag-in-box containers that may be compressed and collapsed after use to reduce waste requirements. The boxes and/or bags may also be biodegradable for a more environmentally friendly solution.

16 Claims, 3 Drawing Sheets

(56) References Cited

U.S. PATENT DOCUMENTS

| | | | |
|---|---|---|---|
| 2012/0042826 A1* | 2/2012 | Galvin | B32B 37/1284 |
| | | | 118/612 |
| 2018/0193854 A1* | 7/2018 | Haney | B05B 9/007 |
| 2022/0168775 A1* | 6/2022 | Swanson | B05C 17/00556 |

* cited by examiner

CRACK-FILLING JOINT PUMP APPLICABLE TO POLISHED CONCRETE FLOORS

REFERENCE TO RELATED APPLICATIONS

This application claims priority to and the benefit of U.S. Provisional Patent Application Ser. No. 63/213,289, filed Jun. 22, 2021, the entire content of which is incorporated herein by reference.

FIELD OF THE INVENTION

This invention relates generally to polished concrete floors and, in particular, to an improved joint pump for filling cracks and irregularities in conjunction with polished concrete floors.

BACKGROUND OF THE INVENTION

Polished concrete floors are becoming increasingly popular for retailers, big-box stores, educational and medical facilities, and even residential applications. Common uses include warehouses and warehouse outlets, hotels and restaurants, office buildings and showrooms. Benefits include low cost, resistance to wear, low maintenance, and aesthetic appeal in many situations. Polished concrete floors are easy to clean, and the glossy surface of polished concrete resists the marks of forklift truck tires and staining from oil and chemical spills. The glossy appearance of polished concrete is desirable for office building, hotels, restaurants, and other public facilities that want to project a bright, clean, professional image.

Various different types of machines are used to achieve a polished concrete floor, including riding and walk-behind coarse and fine grinders and polishers using wet and dry techniques. Machines are also available for stripping and removing old floors, filling in cracks, applying concrete overlays, as well as slurry and dust collection.

The polishing process itself proceeds through a series of mechanical and grinding stages utilizing professional equipment designed for these purposes. The process may also include the use a a concrete "densifier" which penetrates into the concrete to harden and dustproof the surface. The concrete surface is processed through a series of steps with grinding and polishing disks having progressively finer grits. The disks are typically fabricated with industrial diamonds in a bonded material such as metal, resin or a combination thereof often referred to as "diamond polishing pads."

Typically the concrete goes through a process of grinding and polishing using aggressive equipment and abrasive elements or tooling, including pads of varying grit from 30 to 3,000. Concrete is considered "polished" until grits of 800 or finer are used, followed by finishing to 1500 3000-grit levels. The concrete may be ground without entering aggregate layers, or different sizes of aggregate may be exposed and polished to achieve different appearances. Dyes designed for concrete polishing are often applied to add color to polished concrete for borders, logos and decorative patterns. Such options provide a wide range of surface finish and color variations.

Concrete grinding and polishing begins with grinding pads or tools that have grits of 30, 70, and 120, which are used successively. These abrasive elements are rotated at a relatively slow speed during the grinding steps, e.g., at rotating speeds in the range of about 500 to 800 rpm. After grinding with the diamond pads, honing steps follow using grits of 50, 100, and 200, rotated at, fix example, a speed a about 800 rpm. After about 200-grit honing step, dies or stains may be applied and, if necessary, a concrete densifier may be applied to the floor.

Polishing continues using a 400 grit or finer pad, with rotational speeds of the spindles and abrasive elements being in the range of about 800 to 1,100 rpm. The concrete will begin to develop a sheen, with the grit choice of the final polishing steps being dependent upon the reflection and shine desired. If the polishing process is continued through use of a 3000-grit pad, the concrete will assume a mirror-like finish. Burnishing may further promote a specular appearance. A topical sealer may be optionally applied to the finished floor.

The grinding and polishing steps may be dry or wet. With the latter, a water tank on-board the grinding/polishing machine delivers water to the diamond pads or resin pads through channels to the polishing head. With wet polishing, the generated slurry is collected with a squeegee, and with dry polishing the dust is collected with a vacuum. Typically, the polishing head is enclosed with a shroud that surrounds the rotating pads. A vacuum port is connected with a hose to an externally-provided vacuum, which may be nearby or wheeled alongside the grinding and polishing machine.

Although wet and dry techniques both have advantages and disadvantages, dry polishing tends to be faster, more convenient, and environmentally friendly. Wet polishing uses water to cool the diamond abrasives and eliminate grinding dust. The water acts as a lubricant to reduce friction, but cleanup is more involved. Wet polishing creates a tremendous amount of slurry that crews must collect and dispose of in an environmentally sound manner. With dry polishing, no water is required. Instead, the floor polisher is hooked up to a dust-containment system that vacuums up the mess.

In summary, the process of concrete floor polishing may include some or all of the following steps:
Remove existing coating(s);
Deposit new layer of concrete onto uneven or damaged floor;
Seal cracks, joints or imperfections with an epoxy or other semi-rigid filler;
Progressively grind with a 30/40-, 80- and 150-grit metal-bonded diamond pads;
Optionally apply a chemical hardener to densify the concrete;
Progressively polish with a 100/200-, 400- and 800-grit resin or metal-bonded diamond pads;
Apply optional dye(s) for coloration;
Finish with a 1500- or 3000-grit resin-bonded diamond pads to achieve a desired sheen level; and
Optionally seal to help protect the polished surface and make it easier to maintain.

SUMMARY OF THE INVENTION

This invention improves upon existing joint- and crack-filling equipment by providing a lightweight, battery-operated walk-behind wheeled cart with no belts or chains to wear out, and with no inverters or other electrical power-conversion apparatus required. The preferred embodiment uses a single brushless battery-operated DC motor directly coupled to two pumps, each delivering a separate part of the filler material to a wand, such that a single user can push the cart and apply the mixture.

A walk-behind machine for dispensing a two-part hardening material according to the invention includes a frame with a handle and single set of right and left wheels. The frame accommodates two containers holding first and second parts of a hardening mixture such as epoxy parts A and B. At least one battery supported on the frame powers an electric motor. The motor is coupled to a gearbox operative to simultaneously drive outwardly extending opposing axles. Each axle is coupled to a respective pump, and each pump has an inlet and an outlet. The inlets to the pumps are adapted for coupling to the respective containers, and the outlets of the pumps are adapted for coupling to a dispensing wand through separate lengths of flexible tubing. In one specific embodiment two 12-V car batteries are used to power a 24-volt motor. The wand preferably includes an ON-OFF switch coupled to the motor.

The containers may be pails or buckets. However, in accordance with a alternate configuration, the containers are bag-in-box containers that may be compressed and collapsed after use to reduce waste requirements. The boxes and/or bags may also be biodegradable for a more environmentally friendly solution.

DETAILED DESCRIPTION OF THE INVENTION

As mentioned in the Background of the Invention, cracks and irregularities may need to be filled prior to, or in conjunction with, concrete floor grinding and polishing operations. To be sure, there are devices and machines on the market designed for this purpose. However, these devices and unnecessarily complex and/or difficult to use, particularly for a single operator.

For example, existing walk-behind "joint pumps" are battery operated, but they use an inefficient electrical system, presumably for the purpose of providing a motor-speed control which many operators don't even use. Existing machines use a 12-V car battery for the sake of convenience and rechargeability. However, these machines further include a voltage inverter to convert the 12 volts DC into AC, then rectify the AC to power a 90-VDC motor providing a motor speed control. These conversions not only add to inefficiency, requiring more frequent battery recharging, the added equipment also adds weight.

Walk-behind joint pumps on the market also use chain drive, which affects reliability and increases the need for maintenance. The added equipment and weight leads to the use of frames with four wheels which, in turn, results in reduced maneuverability.

This invention solves the above-mentioned problems with the prior art by providing a simplified joint pump for filling in cracks and irregularities in concrete floors prior to, or in conjunction with, grinding or polishing. The machine is much lighter in weight, enabling two wheels to support the frame, facilitating enhanced maneuverability similar to the use of a hand-truck. The device is more easily used by a single operator, and intentionally does not use a motor speed control, since it is just as easy or easier for the single operator walk slower or faster to achieve satisfactory results.

Figure 1:
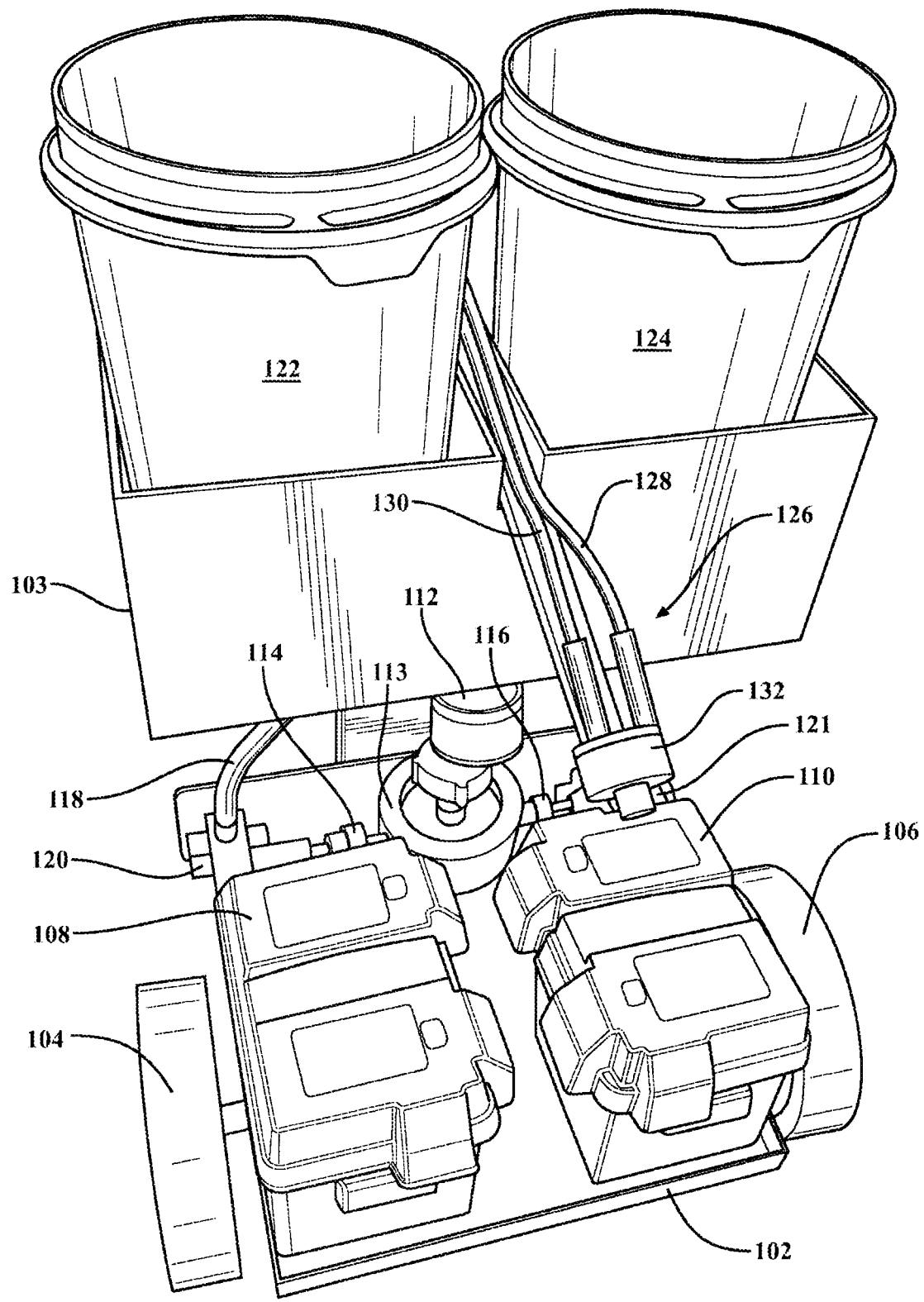
FIG. 1 is a front perspective view of a preferred embodiment of the invention.
Figure 2:
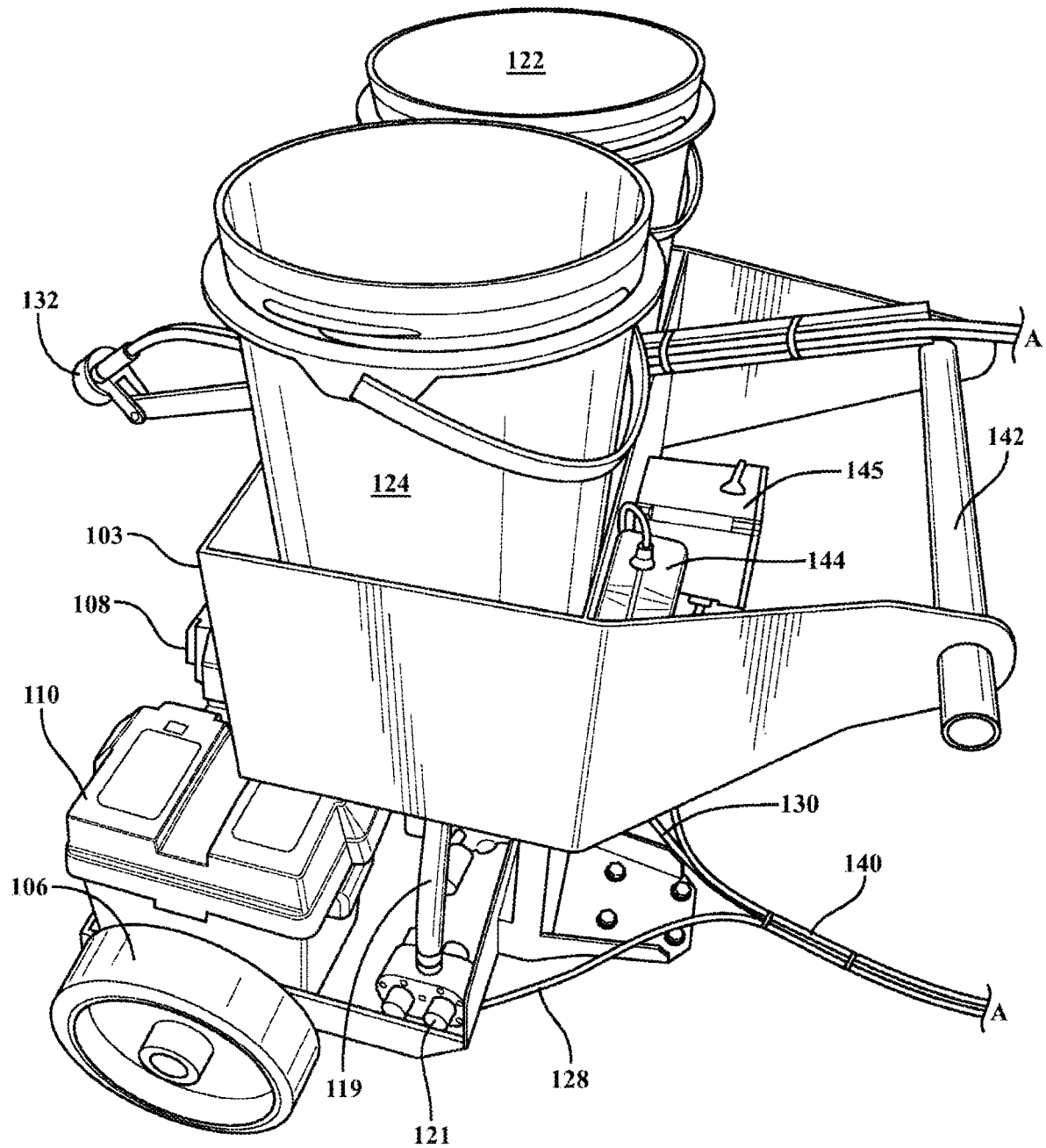
FIG. 2 rear side perspective view of the preferred embodiment.

Now making reference to the accompanying drawings, FIG. 1 is a front perspective view of a preferred embodiment of the invention, and FIG. 2 rear side perspective view. The lighter-weight frame 102, which can now be supported with two wheels 104, 106, includes a base platform that carries batteries 108, 110 and electric motor 112. Motor 112 drive a gearbox 113 which in turn rotates outwardly extending axles 114, 116. The axles simultaneously drive pumps 120, 121.

In the preferred embodiment of the invention, two 12-volt rechargeable car batteries are used in series to drive a 24-volt brushless DC motor 112. It will be appreciated by those of skill in the art that more or fewer batteries of different types may be used including lithium to power different types of motors may be used at different voltage levels. With existing machines that use inverters and voltage conversion, when the battery voltage drops below a threshold voltage, the machine simply stops working due to the electronics of the inverter. With the instant invention, however, the machine simply slows down with reduced battery voltage, informing the operator and letting the operator work a little while longer.

The frame 102 is rigidly coupled to an upper section 103 configured to hold containers 122, 124 for a two-part solidifying mixture. For example, the machine may accommodate two 5-gallon epoxy resin and hardener (i.e., part A and part B) buckets. Each part feeds a respective one of the pumps 120, 121 through separate lines 118, 119, and each pump respectively feeds separate lines 128, 130 to a hand-carried wand 126. The wand 126 has a proximal end with connections for the tubes 128, 130, and a distal end to receive a disposable mixer extension piece (not shown) of conventional design. The Proximal end of the wand also includes a user control to turn the motor 112 ON and OFF, with wiring 140 in electrical communication with a master on/off switch 145 and circuit protection via a fuse (not shown). Numerical reference 144 points to an on-board battery charger.

As shown in FIG. 1, the wand may be carried in a recess in the frame between the 2-part components and, as shown in FIG. 2, the upper portion of the frame extends rearwardly to a handle 142. In operating, motor 112 rotates axles 114, 116 at precisely the same speeds, such that pumps 120, 121 draw equal amounts from respective containers 122, 124. If ratios other that 1:1 are desired, valves may be added in lines 118, 119 or 128, 130 to change the ratio even with the pumps operating at the same speed. Note that the apparatus contains no chains or belts to wear out as compared to existing machines.

Figure 3:
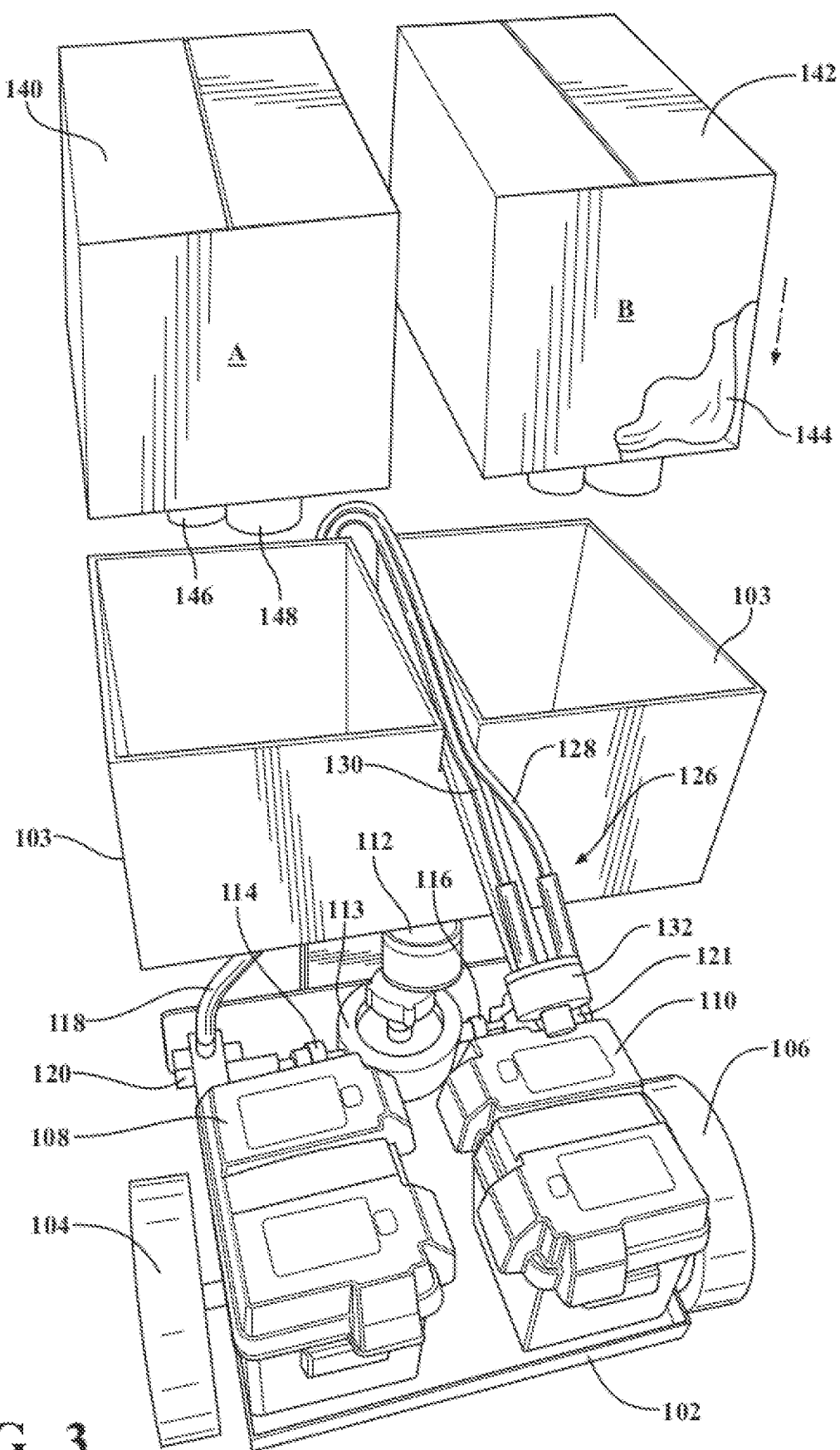
FIG. 3 illustrates an alternative embodiment of the invention wherein the two-part filler material is provided as 'bag-in-box' products.

FIG. 3 is a drawing that illustrates an alternative embodiment of the invention wherein the two-part filler material is provided as 'bag-in-box' products 140, 142. These would be placed into the receptacle 103 instead of the buckets shown in FIGS. 1, 2. Each box 140, 142 would include an internal bag (i.e., 144) filled with respective part of the hardening mixture (i.e., epoxy parts A, B). The bottom of each box would come with a coupling 146 with optional valve 148 adapted for attachment to lines 118, 119 feeding pumps 120, 121. In operation, the contents of both bags would be consumed at equal (or adjustable) rates, until the bag in each box is fully collapsed. This arrangement offer significantly advantages in terms of disposal, as the boxes may be collapsed once the contents are emptied, reducing the space required by the many buckets typically used on larger jobs.

The invention claimed is:
1. A walk-behind machine for dispensing a two-part hardening material, comprising:

a frame with a handle and a single set of right and left wheels;

wherein the frame accommodates two containers holding first and second parts of a hardening mixture;

at least one battery supported on the frame;

an electric motor supported on the frame and powered by the at least one battery;

wherein the motor is coupled to a gearbox operative to simultaneously drive outwardly extending opposing axles;

each axle being coupled to a respective pump, each pump having an inlet and an outlet, and wherein the inlets to the pumps are adapted for coupling to the respective containers supported by the frame, and the outlets of the pumps are adapted for coupling to a dispensing wand through separate lengths of flexible tubing, wherein the separate lengths of flexible tubing each extend from the outlet of the respective pump to the dispensing wand; and wherein the machine has no belts, chains, or electrical power-conversion apparatus.

2. The machine of claim 1, including two 12-V car batteries powering a 24-volt motor.

3. The machine of claim 1, wherein the wand includes an ON-OFF switch for the motor.

4. The machine of claim 1, wherein the containers are bag-in-box containers adapted for coupling to the respective pumps.

5. The machine of claim 1, wherein the frame includes an upper section configured to hold the two containers.

6. The machine of claim 5, wherein the at least one battery, the electric motor, and the pumps are mounted underneath the upper section.

7. The machine of claim 6, wherein the two containers are fluidly connected to the two pumps via separate feed lines.

8. The machine of claim 5, wherein the upper section includes an on-board battery charger for charging the at least one battery.

9. The machine of claim 1, wherein the electric motor is a DC motor directly coupled to the pumps via the gearbox.

10. A walk-behind machine for dispensing a two-part hardening material, comprising:

a frame with a handle and a set of right and left wheels;

two containers accommodated by the frame for holding first and second parts of a hardening mixture;

at least one battery supported on the frame;

an electric motor supported on the frame and powered by the at least one battery;

wherein the electric motor is coupled to a gearbox operative to simultaneously drive outwardly extending opposing axles;

two pumps each coupled to a respective one of the axles, each pump having an inlet and an outlet, and wherein the inlets to the two pumps are adapted for coupling to the respective containers supported by the frame via separate feed lines, and the outlets of the pumps are adapted for coupling to a dispensing wand via separate lines of flexible tubing;

wherein the separate lines of flexible tubing each extend from the outlet of the respective pump to the dispensing wand; and wherein the machine has no belts, chains, or electrical power-conversion apparatus.

11. The machine of claim 10, wherein the electric motor is a DC motor directly coupled to the pumps via the gearbox.

12. The machine of claim 10, wherein the at least one battery includes two 12-V batteries.

13. The machine of claim 10, wherein the two containers are bag-in-box containers adapted for coupling to the respective pumps.

14. The machine of claim 10, wherein the frame includes an upper section configured to hold the two containers.

15. The machine of claim 14, wherein the at least one battery, the electric motor, and the pumps are mounted underneath the upper section.

16. The machine of claim 14, wherein the upper section includes an on-board battery charger for charging the at least one battery.

* * * * *